(12) United States Patent
Kim et al.

(10) Patent No.: US 11,601,625 B2
(45) Date of Patent: Mar. 7, 2023

(54) COLOR STAIN ANALYZING METHOD AND ELECTRONIC DEVICE USING THE METHOD

(71) Applicant: Samsung Electronics Co., Ltd., Suwon-si (KR)

(72) Inventors: Kundong Kim, Seongnam-si (KR); Sungsu Kim, Yongin-si (KR); Younghoon Kim, Goyang-si (KR); Jungmin Lee, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 137 days.

(21) Appl. No.: 17/078,605

(22) Filed: Oct. 23, 2020

(65) Prior Publication Data

US 2021/0266504 A1     Aug. 26, 2021

(30) Foreign Application Priority Data

Feb. 24, 2020  (KR) .................. 10-2020-0022347

(51) Int. Cl.
*G06T 7/90*     (2017.01)
*H04N 9/083*    (2006.01)
*H04N 9/825*    (2006.01)

(52) U.S. Cl.
CPC .............. *H04N 9/083* (2013.01); *G06T 7/90* (2017.01); *H04N 9/825* (2013.01)

(58) Field of Classification Search
CPC ....................................................... G06T 7/90
See application file for complete search history.

(56) References Cited

U.S. PATENT DOCUMENTS

| | | | | |
|---|---|---|---|---|
| 8,004,545 | B2 * | 8/2011 | Inuzuka | G09G 3/3413 345/87 |
| 8,400,533 | B1 * | 3/2013 | Szedo | H04N 9/04517 348/241 |
| 8,525,920 | B2 * | 9/2013 | Seto | H04N 9/735 348/278 |
| 8,654,140 | B2 * | 2/2014 | Kanai | H04N 9/77 345/589 |

(Continued)

FOREIGN PATENT DOCUMENTS

| | | |
|---|---|---|
| JP | 2005326323 A | 11/2005 |
| JP | 2010139324 A | 6/2010 |

(Continued)

*Primary Examiner* — Brian P Yenke
(74) *Attorney, Agent, or Firm* — Muir Patent Law, PLLC

(57) ABSTRACT

An electronic device includes a frequency analyzing circuit and a color difference calculating circuit. The frequency analyzing circuit receives an image signal including information about a subject, may convert the image signal into first color data which are based on a first color domain, converts the first color data into frequency data which are based on a frequency domain, and applies frequency weights corresponding to the frequency data to the first color data to generate processed color data. The color difference calculating circuit calculates color difference values for evaluating a color stain generated by the image signal, based on the processed color data. The frequency weights are selected based on sensitivity information of an observer according to a frequency change of the frequency data.

16 Claims, 13 Drawing Sheets

(56) References Cited

U.S. PATENT DOCUMENTS

| | | | |
|---|---|---|---|
| 8,837,852 B2* | 9/2014 | Park | H04N 5/3675 |
| | | | 382/162 |
| 9,667,842 B2 | 5/2017 | Baqai et al. | |
| 9,979,956 B1* | 5/2018 | D'Amico | G06T 7/11 |
| 10,733,763 B2* | 8/2020 | Lee | G09G 3/006 |
| 10,943,530 B1* | 3/2021 | Yeh | G09G 3/3208 |
| 11,134,203 B2* | 9/2021 | Park | H04N 5/243 |
| 11,138,701 B2* | 10/2021 | Wang | G06T 7/13 |
| 11,138,937 B2* | 10/2021 | Park | G09G 3/20 |
| 11,158,033 B2* | 10/2021 | Wang | G06T 7/13 |
| 11,170,687 B2* | 11/2021 | Heo | G09G 3/20 |
| 2010/0013750 A1* | 1/2010 | Kerofsky | G09G 3/006 |
| | | | 345/89 |
| 2014/0198101 A1* | 7/2014 | Vilkin | G06T 13/20 |
| | | | 345/419 |
| 2018/0166030 A1* | 6/2018 | Liu | G09G 3/3696 |
| 2018/0190214 A1* | 7/2018 | Kim | G09G 3/20 |
| 2019/0035112 A1* | 1/2019 | Lee | G06T 7/0008 |
| 2021/0304376 A1* | 9/2021 | Inoue | G06T 5/007 |

FOREIGN PATENT DOCUMENTS

| | | | |
|---|---|---|---|
| JP | 5321939 B2 | 10/2013 | |
| KR | 100776379 B1 | 11/2007 | |
| KR | 101980755 B1 | 5/2019 | |
| WO | 2014013792 A1 | 1/2014 | |

* cited by examiner

```
0.0 < a color difference value < 1.0 : unnoticeable
1.0 < a color difference value < 2.0 : only noticed by a few observer
2.0 < a color difference value < 3.5 : noticed by general observer
3.5 < a color difference value < 5.0 : clearly noticeable
5.0 < a color difference value      : two different colors
```

COLOR STAIN ANALYZING METHOD AND ELECTRONIC DEVICE USING THE METHOD

CROSS-REFERENCE TO RELATED APPLICATIONS

This application claims priority under 35 U.S.C. § 119 to Korean Patent Application No. 10-2020-0022347 filed on Feb. 24, 2020, in the Korean Intellectual Property Office, the disclosure of which is incorporated by reference herein in its entirety.

BACKGROUND

Embodiments of the inventive concept described herein relate to an electronic device having a photographing function, and more particularly, relate to an electronic device for analyzing a color stain of a captured image.

An image sensor has been mounted in various types of electronic devices. For example, an electronic device that includes the image sensor may be implemented with one of various types of electronic devices such as a smartphone, a tablet personal computer (PC), a laptop PC, and a wearable device.

The image sensor converts information about a light incoming through a camera lens into a digital signal. An electronic device displays an image in a display panel by using the digital signal.

In the case where the amount of light incoming through the camera lens is insufficient, color stains may appear at an image. In the case where color stains appear, a user typically perceives an image displayed in the display panel as a low-quality image. Accordingly, there is desired a technology for reducing color stains appearing at an image, particularly for images captured in a dark place.

SUMMARY

Embodiments of the inventive concept provide an electronic device for analyzing color stains.

According to an exemplary embodiment, an electronic device includes a frequency analyzing circuit and a color difference calculating circuit. The frequency analyzing circuit receives an image signal including information about a subject, converts the image signal into first color data which are based on a first color domain, converts the first color data into frequency data which are based on a frequency domain, and applies frequency weights corresponding to the frequency data to the first color data to generate processed color data. The color difference calculating circuit may calculate color difference values for evaluating a color stain generated by the image signal, based on the processed color data. The frequency weights may be selected based on a relationship between sensitivity information of an observer and a change in frequency of the frequency data.

According to an exemplary embodiment, an electronic device includes a frequency analyzing circuit, a color difference calculating circuit, and a color stain classifying circuit. The frequency analyzing circuit may receive a first image signal including information about a light input to a first pixel and a second image signal including information about a light input to a second pixel, may generate first processed data from the first image signal and generate second processed data from the second image signal based on frequency weights respectively corresponding to the first image signal and the second image signal. The color difference calculating circuit may calculate a color difference value by using the first processed data and the second processed data based on the frequency weights respectively corresponding to the first image signal and the second image signal. The color stain classifying circuit may evaluate whether a color stain generated by the first processed data and the second processed data is noticeable by an observer, based on the color difference value. The frequency weights may be selected based on a relationship between sensitivity information of the observer and a change in frequency of each of the first image signal and the second image signal.

According to an exemplary embodiment, a frequency analyzing method includes a color difference calculating method and a color stain classifying method. The frequency analyzing method may receive an image signal including information about a subject and may generate processed color data based on the image signal and a frequency weight corresponding to a frequency of the image signal. The color difference calculating method may calculate color difference values for evaluating a color stain generated by the image signal, based on the processed color data. The color stain classifying method may select color stains noticeable by an observer from among color stains corresponding to the color difference values, based on setting data indicating a range of a color difference value noticeable by the observer.

BRIEF DESCRIPTION OF THE FIGURES

The above and other objects and features of the inventive concept will become apparent by describing in detail exemplary embodiments thereof with reference to the accompanying drawings.

DETAILED DESCRIPTION

Below, embodiments of the inventive concept are described in detail and clearly to such an extent that an ordinary one in the art easily implements the inventive concept.

Figure 1:
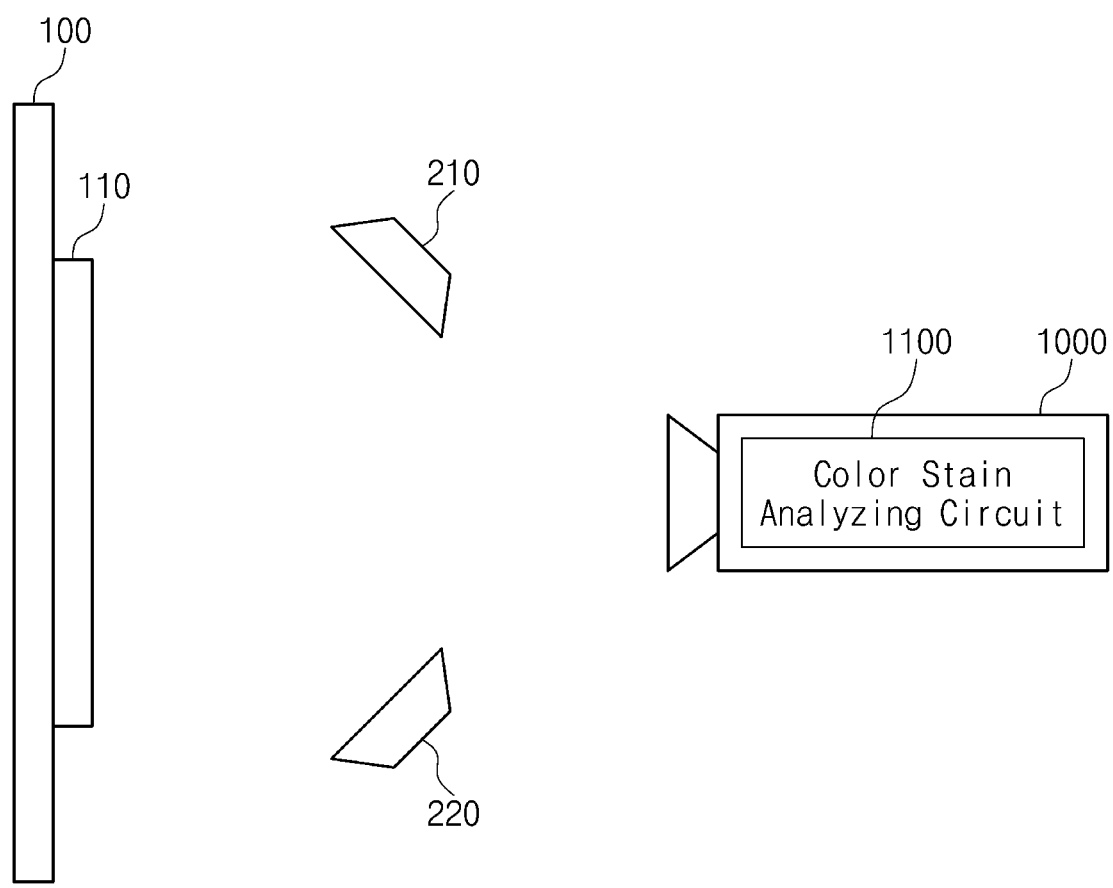
FIG. 1 is a conceptual diagram for describing an electronic device according to an embodiment of the inventive concept.

FIG. 1 is a conceptual diagram for describing an electronic device according to an embodiment of the inventive concept.

An electronic device 1000 may photograph a subject 100 on which a test chart 110 is marked. A light output from lighting apparatuses 210 and 220 may be reflected by the subject 100. The electronic device 1000 may receive signals reflected by the subject 100. The electronic device 1000 may generate an image based on the received signals.

The electronic device 1000 may be an electronic device having a photographing function. For the photographing function, the electronic device 1000 may include a lens, an aperture, a sensor, an image signal processor, etc. A detailed structure of the electronic device 1000 will be described with reference to FIGS. 14 and 15. For example, the electronic device 1000 may be implemented with one of various types of electronic devices such as a smartphone, a tablet PC, a laptop PC, an e-book reader, an MP3 player, a digital camera, and a wearable device.

The electronic device 1000 may include a color stain analyzing circuit 1100. A color stain is generated by a color difference between two pixels of an image. For example, when the color stain is generated, a color of the image appears to be crushed or a stain appears at the image. Whether the color stain is noticeable to an observer or not may depend on an amount of the color difference and a visual recognition characteristic of the observer. The color stain may occur when the amount of light input to a lens is insufficient.

The electronic device 1000 may generate a signal associated with luminance and a signal associated with a color, based on received signals. Observer's sensitivity may vary depending on a frequency of the signal associated with the luminance, a frequency of the signal associated with the color, lightness of an ambient environment, a distance between a subject and the electronic device 1000, etc. The color stain analyzing circuit 1100 according to an embodiment of the inventive concept is configured to calculate the number of color stains and a size of color stains in consideration of a visual recognition characteristic of an observer. The observer's sensitivity may mean how sensitively an observer reacts to a change of stimulation (e.g., how much of a change in an aspect of the signal is needed for the observer to notice a change). The stimulation may be, for example, the signal associated with the luminance, the signal associated with the color, the lightness of the ambient environment, and the distance between the subject and the electronic device 1000.

The user may fail to perceive a color stain when a size of the color stain is small and the number of color stains is small. In contrast, the user may perceive a color stain when the size of the color stain is large and the number of color stains is great. The color stain analyzing circuit 1100 according to an embodiment of the inventive concept may analyze and evaluate a color stain performance of the electronic device 1000 by using information about a size of a color stain noticeable by the user and the number of color stains noticeable by the user. For example, the color stain analyzing circuit 1100 may analyze a strength of a color stain, a probability of occurrence of a color stain for each lightness of an ambient environment, a region where a color stain occurs, etc.

According to an embodiment of the inventive concept, the electronic device 1000 may be a test device for evaluating and improving components (e.g., a lens, a sensor, an aperture, and an image signal processor) included in the electronic device 1000 before a product is released. The electronic device 1000 may photograph the subject 100 on which the test chart 110 is marked and may then provide information about color stains to the user (e.g., a technician). The information about color stains may include a strength of a color stain, a probability of occurrence of a color stain for each lightness of an ambient environment, a region where a color stain occurs, etc. In this case, based on the information provided from the electronic device 1000, the user may change specifications of the lens, the sensor, the aperture, and the image signal processor or may adjust setting conditions of the lens, the sensor, the aperture, and the image signal processor. Through this test process, a product to be released may have a higher performance with regard to a color stain. A detailed configuration of the electronic device 1000 that is used as a test device will be more fully described with reference to FIG. 14.

According to another embodiment of the inventive concept, the electronic device 1000 may be a photographing device that is already released and a consumer uses. In this case, the electronic device 1000 may photograph various subjects. The color stain analyzing circuit 1100 may analyze color stains based on signals received in photographing. The electronic device 1000 may remove noise causing color stains based on information received from the color stain analyzing circuit 1100, at a noise processing step. Accordingly, the quality of image may be improved. In the case where the electronic device 1000 is a photographing device that a consumer uses, a detailed configuration of the electronic device 1000 will be more fully described with reference to FIG. 15.

Figure 2:
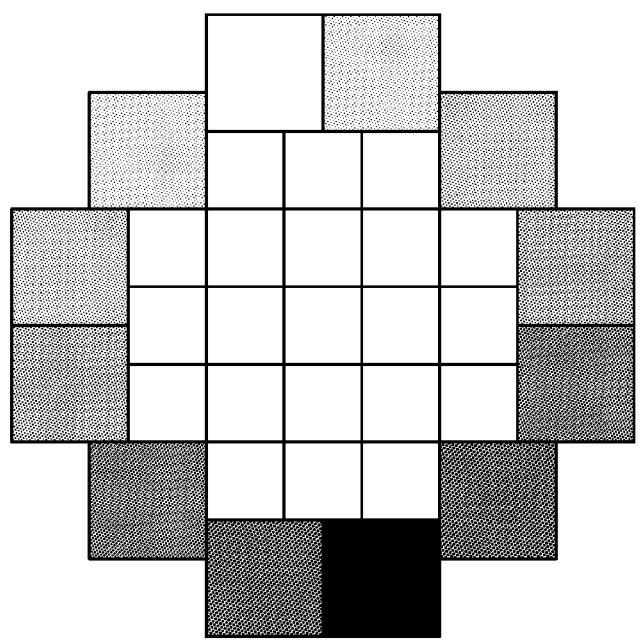
FIG. 2 is a conceptual diagram for describing a test chart of FIG. 1.

FIG. 2 is a conceptual diagram for describing a test chart of FIG. 1.

In the case where the electronic device 1000 is a test device, the electronic device 1000 may photograph the test chart 110 to analyze a color stain performance of the electronic device 1000. In descriptions below, the color stain performance of the electronic device 1000 may be indicated by an index indicating how much color stains appear at an image captured by the electronic device 1000. As the color stain performance of the electronic device 1000 increases, the number of color stains appearing at the image captured by the electronic device 1000 decreases. As the color stain performance of the electronic device 1000 decreases, the number of color stains appearing at the image captured by the electronic device 1000 increases. A color stain appearing at an image refers to a color stain noticeable by the user.

The user (e.g., a technician) may adjust specifications and settings of components (e.g., a lens, a sensor, an aperture, and an image signal processor) of the electronic device 1000, based on an analysis result. However, the inventive concept is not limited thereto. For example, the electronic device 1000 may adjust the specifications and settings of the components (e.g., a lens, a sensor, an aperture, and an image signal processor) based on an analysis result without intervention of the user.

The test chart 110 may include test boxes of a square shape. An edge of the test chart 110 may include test boxes of black and white colors. The test boxes of black and white colors may have different shades. Also, the test boxes of black and white colors may be spaced from the center of the test chart 110 by a distance at least as great as a width of the test boxes. The test boxes may be arranged with mirror symmetry with respect to a line passing through a center of the test chart 110 and extending in the same direction as the extension direction in which an edge of one of the test boxes extends.

An inner portion between the edge and the center of the test chart 110 may be composed of test boxes of various colors. In the test boxes of various colors, colors of different test boxes adjacent to each other may be different. Also, a size of each of the test boxes of various colors may be smaller than a size of each of the test boxes of black and white colors. However, the inventive concept is not limited thereto. For example, test boxes may be of various shapes and various sizes.

The electronic device 1000 may reduce the number of times of photographing used to analyze a color stain performance by photographing the test chart 110. In the case where the test chart 110 is not used, the electronic device 1000 may have to photograph black-and-white subjects having different shades. Also, the electronic device 1000 may have to photograph subjects having different colors. In the case of using a test chart according to an embodiment of the inventive concept, the electronic device 1000 may reduce the number of times of photographing and may reduce the amount of data to be processed to analyze a color stain performance.

Figure 3:
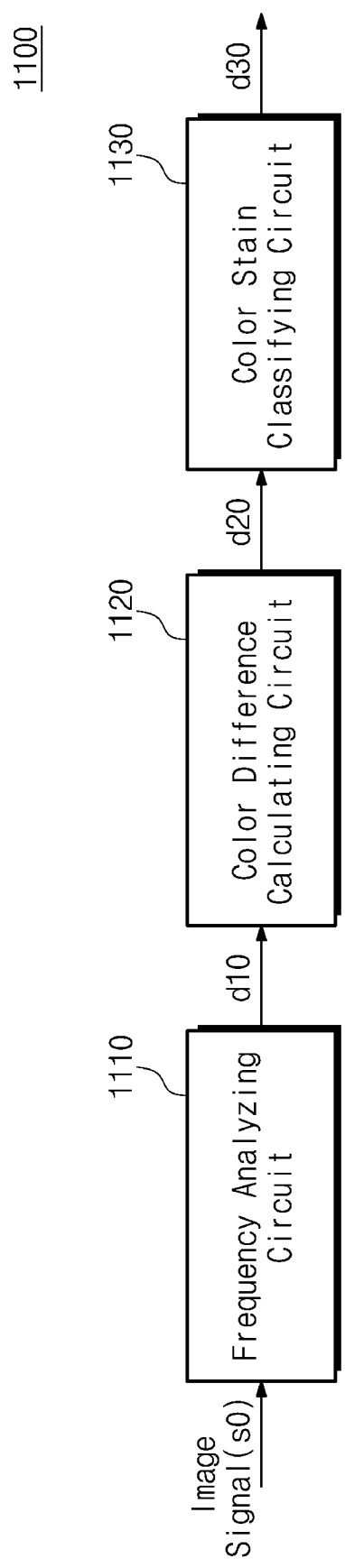
FIG. 3 is a block diagram for describing a color stain analyzing circuit of FIG. 1, according to certain embodiments.

FIG. 3 is a block diagram for describing a color stain analyzing circuit of FIG. 1, according to certain embodiments.

The color stain analyzing circuit 1100 may include a frequency analyzing circuit 1110, a color difference calculating circuit 1120, and a color stain classifying circuit 1130. The various circuits described herein are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of circuits being implemented by microprocessors or similar, they may be programmed using software (e.g., microcode) to perform various functions discussed herein and may optionally be driven by firmware and/or software. Alternatively, each circuit may be implemented by dedicated hardware, or as a combination of dedicated hardware to perform some functions and a processor (e.g., one or more programmed microprocessors and associated circuitry) to perform other functions. The various circuits described herein are configured to perform the different functions described below.

The electronic device 1000 of FIG. 1 may include a lens and an image sensor in addition to the color stain analyzing circuit 1100. In photographing, the lens may receive a light reflected from a subject. The image sensor may generate an image signal s0 including information about the subject, based on the light received through the lens. The image sensor may include a color filter. For example, the color filter may be an RGB filter (e.g., representatively, having a Bayer pattern). The image sensor may receive only a light of a specific wavelength for each image sensor unit (e.g., pixel) based on the color filter. For example, a light of a wavelength ranging from 580 nm to 670 nm may be received in a region, in which an "R" filter is included, from among regions of the image sensor (e.g., for a first set of pixels). The image sensor may be used to obtain information about colors of the regions based on the light of the specific wavelength received through the color filter. For example, the image sensor may be provided for functions of obtaining information about luminance and a color of each region. The image sensor may generate the image signal s0 based on the obtained information. The image signal s0 may include information about light input to a plurality of pixels. A connection relationship between the image sensor and the color stain analyzing circuit 1100 will be more fully described with reference to FIG. 15.

The frequency analyzing circuit 1110, also described simply as an analyzing circuit, may receive the image signal s0 from the image sensor. The frequency analyzing circuit 1110 may store frequency information about a visual recognition frequency characteristic. The frequency analyzing circuit 1110 may reconfigure the image signal s0 depending on a frequency, by using the image signal s0 and the frequency information. The frequency information may be associated with a frequency of a luminance signal, a frequency of a color signal, a distance between the electronic device 1000 and a subject, lightness of an ambient environment, etc.

The frequency analyzing circuit 1110 may process the image signal s0 to generate first color data. Color data may be a result of expressing an image signal by using coordinates of a color domain. The color domain (or a color space) means a color system such as RGB, XYZ, LAB, or LUV. For example, the first color data may be RGB data. Color domain coordinates "R", "G", and "B" indicate red, green, and blue colors, respectively.

The frequency analyzing circuit 1110 may convert the color domain of the first color data to generate second color data. For example, the frequency analyzing circuit 1110 may convert RGB data into YCbCr data. Color domain coordinate "Y" indicates luminance, and color domain coordinates "Cb" and "Cr" indicate chroma. The frequency analyzing circuit 1110 may obtain frequency values corresponding to the second color data by using the second color data. In detail, in certain embodiments, the frequency analyzing circuit 1110 may obtain frequency values by performing Fourier transform on the second color data. The frequency analyzing circuit 1110 may obtain frequency weights corresponding to the frequency values by using the frequency information. The frequency analyzing circuit 1110 may apply a frequency weight to the second color data. In detail, the frequency analyzing circuit 1110 may multiply a frequency weight and coordinate values of the second color data together. In descriptions below, second color data to which a frequency weight is applied is referred to as "processed color data d10". The frequency analyzing circuit 1110 may output the processed color data d10.

The color difference calculating circuit 1120 receives the processed color data d10. The color difference calculating circuit 1120 may convert a color domain of the processed color data d10 to generate third color data. For example, the third color data may be RGB data. The color difference calculating circuit 1120 may convert the color domain of the third color data to generate fourth color data. For example, the fourth color data may be Lab data. The Lab color domain is a color domain capable of bringing a color difference noticeable by an observer to almost match a color difference expressed by a numerical value in the color domain. Color domain coordinate "L" indicates lightness. A positive axis of color domain coordinate "a" indicates a red color, and a negative axis thereof indicates a green color. Also, a positive axis of color domain coordinate "b" indicates a yellow color, and a negative axis thereof indicates a blue color.

The color difference calculating circuit 1120 may calculate color difference values of the fourth color data. The color difference calculating circuit 1120 may output color difference data d20 based on a calculation result.

The color stain classifying circuit 1130 receives the color difference data d20. The color stain classifying circuit 1130 may store setting data associated with a range of color difference values noticeable by an observer. The color stain classifying circuit 1130 may determine whether color stains corresponding to color difference values of the color difference data d20 is noticeable by an observer, based on the color difference data d20 and the setting data.

The color stain classifying circuit 1130 may select color difference values indicating color stains noticeable by an observer. Based on the selected color difference values, the color stain classifying circuit 1130 may analyze a strength of a color stain, a probability of occurrence of a color stain for each lightness of an ambient environment, a region where a color stain occurs, etc. In descriptions below, a strength of a color stain, a probability of occurrence of a color stain for each lightness of an ambient environment, a region where a color stain occurs, etc. are expressed as a color stain analyzing result. The color stain classifying circuit 1130 generates result data d30 indicating a color stain analyzing result.

Figure 4:
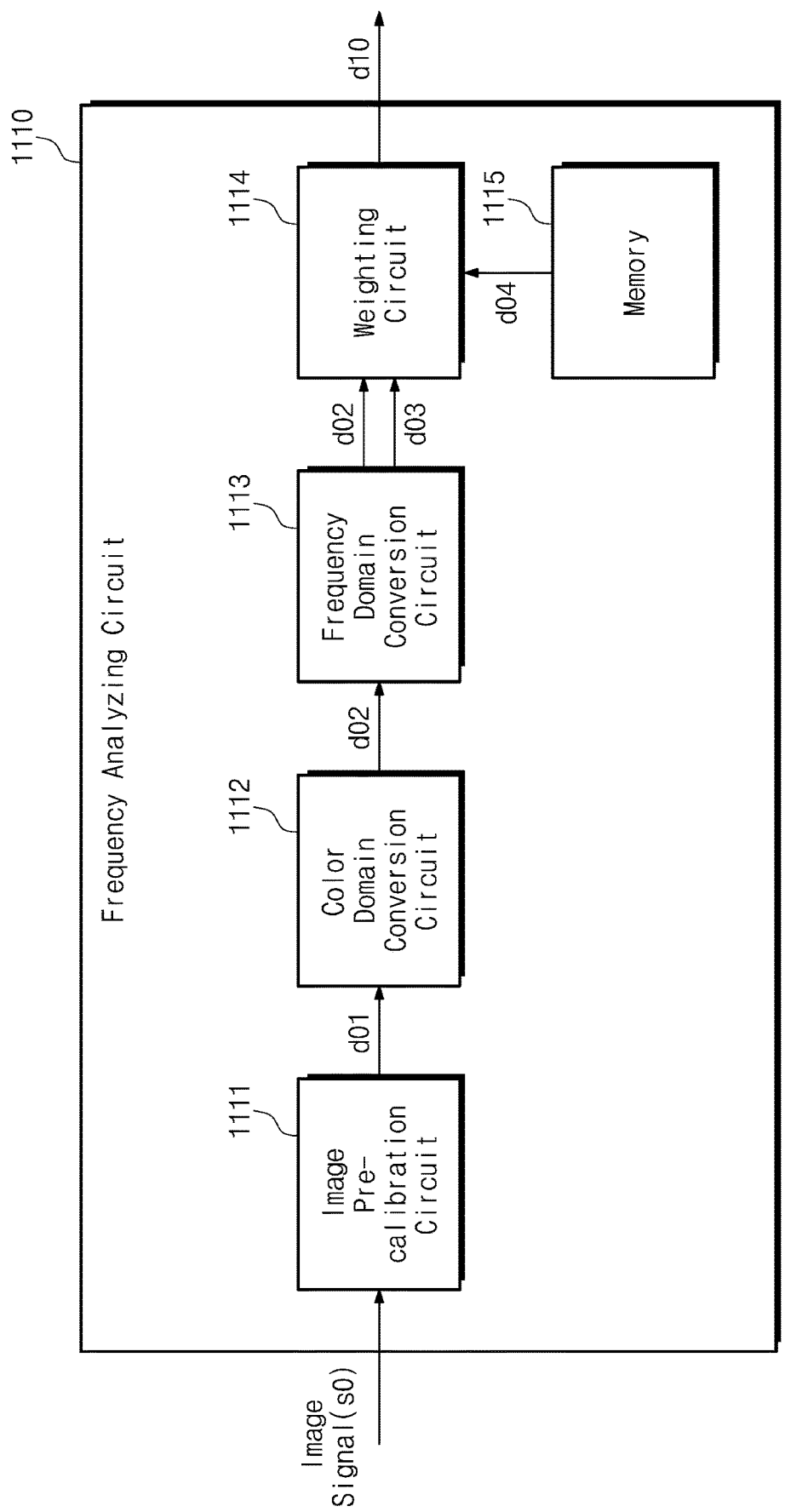
FIG. 4 is a block diagram illustrating a frequency analyzing circuit of FIG. 3, according to certain embodiments.

FIG. 4 is a block diagram illustrating a frequency analyzing circuit of FIG. 3, according to certain embodiments.

The frequency analyzing circuit 1110 may include an image pre-calibration circuit 1111, a color domain conversion circuit 1112, a frequency domain conversion circuit 1113, a weighting circuit 1114, and a memory 1115.

The image pre-calibration circuit 1111 receives the image signal s0 from the image sensor. The image pre-calibration circuit 1111 may remove pedestal values of the image signal s0. Accordingly, the image pre-calibration circuit 1111 may remove unnecessary signals included in the image signal s0 generated by the image sensor, by removing the pedestal values.

The image pre-calibration circuit 1111 may calibrate a white balance of the image signal s0 from which the pedestal values are removed. The image signal s0, of which the white balance is calibrated, may indicate a color close to an actual color of a subject.

The image pre-calibration circuit 1111 may perform a color correction matrix (CCM) operation on the white balance-calibrated image signal s0. Through the CCM operation, the image pre-calibration circuit 1111 may match the white balance-calibrated image signal s0 so as to be close to an sRGB standard color domain.

After performing the CCM operation, the image pre-calibration circuit 1111 may interpolate the image signal s0. The image pre-calibration circuit 1111 may generate first color data d01, based on the interpolated image signal s0. For example, the first color data d01 may be RGB data.

The color domain conversion circuit 1112 receives the first color data d01 from the image pre-calibration circuit 1111. The color domain conversion circuit 1112 converts a color domain of the first color data d01 to generate second color data d02. For example, the second color data d02 may be YCbCr data.

The frequency domain conversion circuit 1113 receives the second color data d02 from the color domain conversion circuit 1112. The frequency domain conversion circuit 1113 converts the second color data d02 into data associated with a frequency domain. For example, the frequency domain conversion circuit 1113 may perform a Fourier transform on the second color data d02 to obtain frequency values. In detail, in the case where the second color data d02 are YCbCr data, frequency values may include a luminance-frequency value corresponding to a luminance value of the second color data d02 and a color-frequency value corresponding to a color value of the second color data d02. The frequency domain conversion circuit 1113 may generate frequency data d03 indicating the frequency values of the second color data d02. The frequency domain conversion circuit 1113 may output the second color data d02 and the frequency data d03.

The memory 1115 may store frequency information. The frequency information may include luminance-frequency information (to be described in detail with reference to FIG. 6) about how the human sensitivity varies depending on a change in a frequency of a luminance signal, color-frequency information (to be described in detail with reference to FIG. 6) about how the human sensitivity varies depending on a change in a frequency of a color signal, lightness-frequency information (to be described in detail with reference to FIG. 7) about how the human sensitivity varies depending on lightness of an ambient environment, and distance-frequency information (to be described in detail with reference to FIG. 8) about how the human sensitivity varies depending on a distance between a subject and the electronic device 1000.

The weighting circuit 1114 receives the second color data d02 and the frequency data d03 from the frequency domain conversion circuit 1113. The frequency data d03 may include frequency values. The weighting circuit 1114 also receives weight data d04, for example, from the memory 1115. The weight data d04 may include frequency information. The weighting circuit 1114 may calculate frequency weights corresponding to the frequency values by using the frequency information. In detail, the weighting circuit 1114 may calculate a luminance-frequency weight corresponding to a luminance-frequency value by using luminance-frequency information. The weighting circuit 1114 may calculate a color-frequency weight corresponding to a color-frequency value by using color-frequency information. Also, the weighting circuit 1114 may obtain a lightness value of an ambient environment and a distance value between the subject and the electronic device 1000 from a main processor (not illustrated). The weighting circuit 1114 may calculate a lightness-frequency weight corresponding to a lightness value and a distance-frequency weight corresponding to a distance value, based on lightness-frequency information and distance-frequency information respectively.

The weighting circuit 1114 may combine the obtained frequency weights. For example, the weighting circuit 1114 may multiply lightness-frequency and distance-frequency weights and a luminance-frequency weight together and may multiply lightness-frequency and distance-frequency weights and a color-frequency weight together. Finally, the weighting circuit 1114 may obtain the processed luminance-frequency weight and the processed color-frequency weight. The processed luminance-frequency weight means a value obtained by multiplying the lightness-frequency and distance-frequency weights and the luminance-frequency weight together. The processed color-frequency weight means a value obtained by multiplying the lightness-frequency and distance-frequency weights and the color-frequency weight together.

The weighting circuit 1114 may apply frequency weights to the second color data d02. To apply the frequency weights to the second color data d02 means to multiply the frequency weights and the second color data d02 together.

In detail, the weighting circuit 1114 may multiply the processed luminance-frequency weight and a luminance value of the second color data d02 together. The weighting circuit 1114 may multiply the processed color-frequency weight and a color value of the second color data d02 together. The luminance value of the second color data d02 means a luminance coordinate value of the second color data d02. Also, the color value of the second color data d02 means a color coordinate value of the second color data d02.

The weighting circuit 1114 may apply the frequency weights to the second color data d02 to generate the processed color data d10. For example, the weighting circuit 1114 of the frequency analyzing circuit may increase the luminance value of the first color data in proportion to the luminance-frequency weight and may increase the color value of the first color data in proportion to the color-frequency weight. In addition, the frequency analyzing circuit may increase the luminance value of the first color data and the color value of the first color data in proportion to the lightness-frequency weight and the distance-frequency weight.

Figure 5:
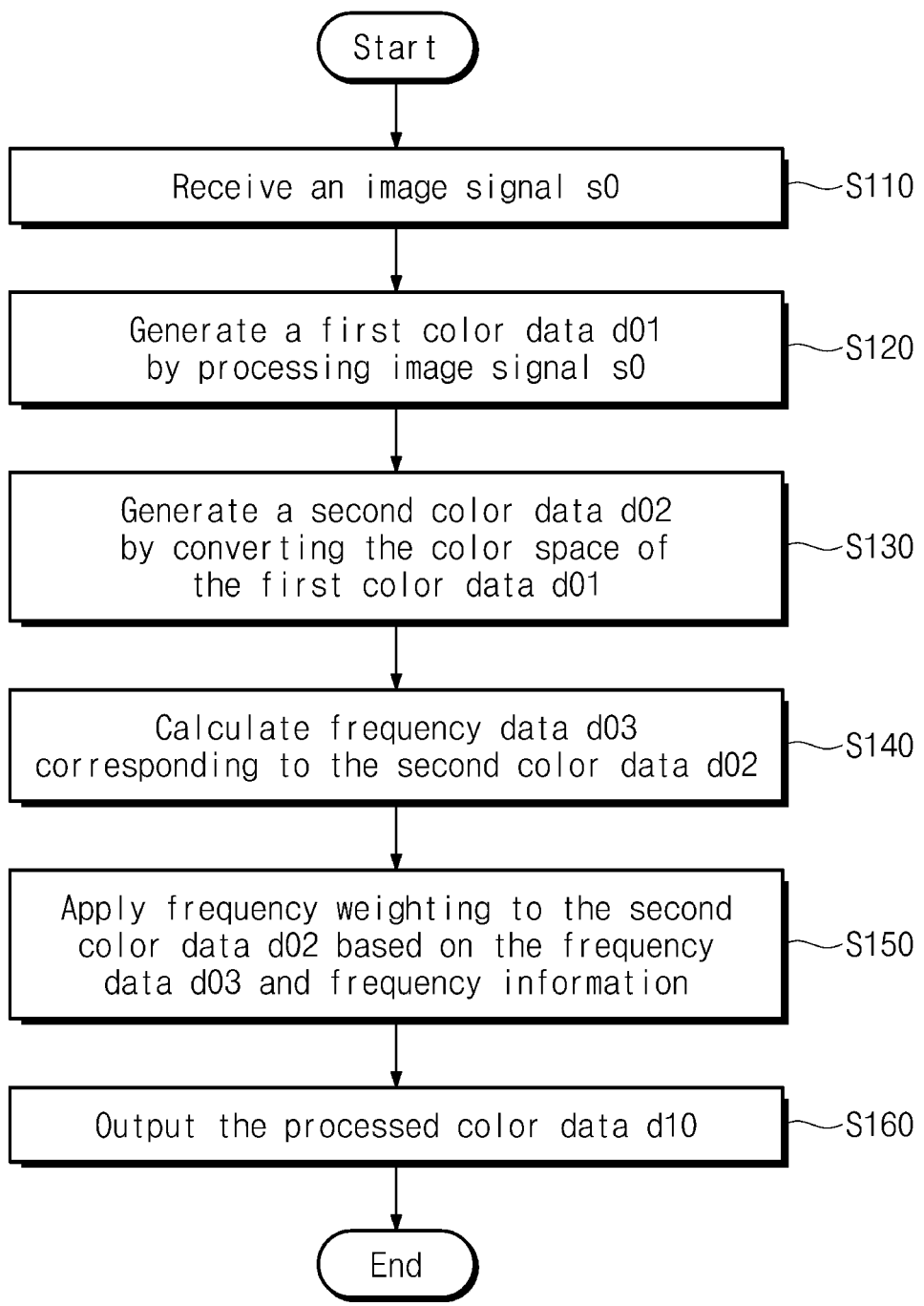
FIG. 5 is a flowchart for describing an operation of a frequency analyzing circuit of FIG. 4, according to certain embodiments.

FIG. 5 is a flowchart for describing an operation of a frequency analyzing circuit of FIG. 4, according to certain embodiments.

In operation S110, the image pre-calibration circuit 1111 receives the image signal s0 from the image sensor.

In operation S120, the image pre-calibration circuit 1111 pre-processes the image signal s0 to generate the first color data d01.

In operation S130, the color domain conversion circuit 1112 receives the first color data d01 from the image pre-calibration circuit 1111. The color domain conversion circuit 1112 converts a color domain of the first color data d01 to generate the second color data d02.

In operation S140, the frequency domain conversion circuit 1113 receives the second color data d02 from the color domain conversion circuit 1112. The frequency domain conversion circuit 1113 performs frequency conversion on the second color data d02 to generate the frequency data d03 corresponding to the second color data d02.

In operation S150, the weighting circuit 1114 receives the second color data d02 and the frequency data d03 from the frequency domain conversion circuit 1113. The frequency data d03 may include frequency values of the second color data d02. The weighting circuit 1114 may receive the weight data d04 from the memory 1115. The weight data d04 may include frequency information. The weighting circuit 1114 may obtain frequency weights corresponding to the frequency values by using the frequency information. The weighting circuit 1114 may apply the frequency weights to the second color data d02.

In operation S160, the weighting circuit 1114 may apply the frequency weights to the second color data d02 to generate the processed color data d10. The weighting circuit 1114 then outputs the processed color data d10 to the color difference calculating circuit 1120 of FIG. 3.

Figure 6:
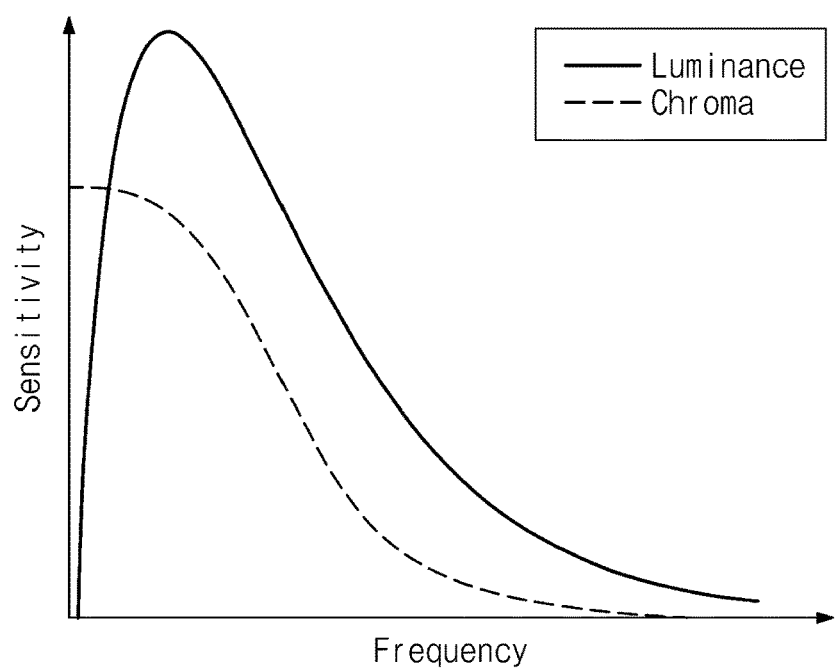
FIG. 6 is a graph for describing luminance-frequency information and color-frequency information.

FIG. 6 is a graph for describing luminance-frequency information and color-frequency information.

A horizontal axis of the graph represents a frequency, or light characteristic value. A vertical axis of the graph represents human sensitivity.

A solid line graph of FIG. 6 indicates how the human sensitivity varies depending on a frequency of a luminance signal. The luminance-frequency information includes information about a correspondence relationship between the frequency of the luminance signal and the human sensitivity. Referring to FIG. 6, the human may perceive that the sensitivity is the highest at a specific frequency of the luminance signal.

A dotted line graph of FIG. 6 indicates how the human sensitivity varies depending on a frequency of a color signal. The color-frequency information includes information about a correspondence relationship between the frequency of the color signal and the human sensitivity. Referring to FIG. 6, the human may perceive that the sensitivity is the highest as the frequency of the color signal decreases.

As described with reference to FIG. 4, the weighting circuit 1114 may receive the frequency data d03. The frequency data d03 may include frequency values. In detail, the frequency values may include a luminance-frequency value corresponding to a luminance value of the second color data d02 and a color-frequency value corresponding to a color value of the second color data d02.

The weighting circuit 1114 may obtain sensitivity corresponding to the luminance-frequency value based on the luminance-frequency information. The weighting circuit 1114 may calculate a luminance-frequency weight based on the obtained sensitivity. A magnitude of the luminance-frequency weight may be proportional to or equal to a magnitude of the obtained sensitivity.

The weighting circuit 1114 may obtain sensitivity corresponding to the color-frequency value based on the color-frequency information. The weighting circuit 1114 may calculate a color-frequency weight based on the obtained sensitivity. A magnitude of the color-frequency weight may be proportional to or equal to a magnitude of the obtained sensitivity.

Figure 7:
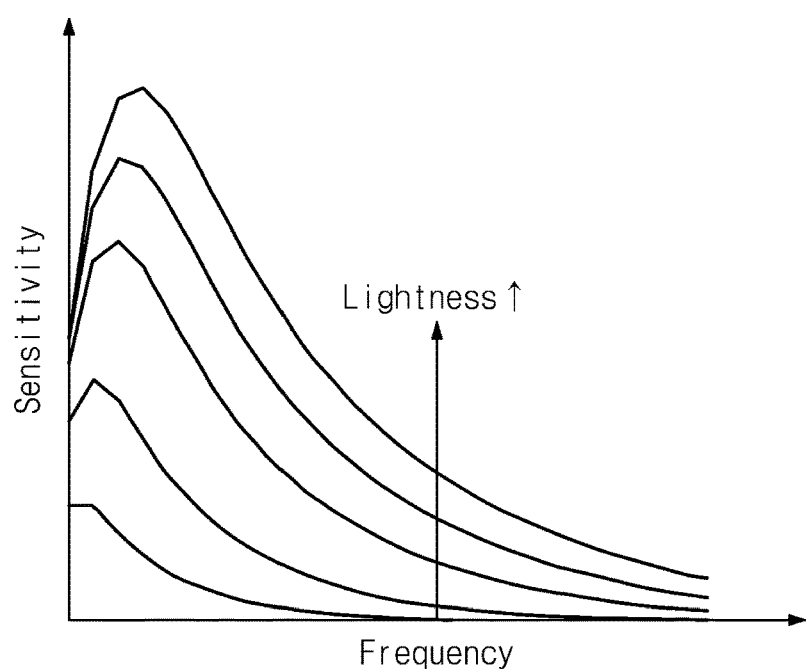
FIG. 7 is a graph for describing lightness-frequency information.

FIG. 7 is a graph for describing lightness-frequency information.

A horizontal axis of the graph represents a frequency. A vertical axis of the graph represents human sensitivity.

A graph of FIG. 7 indicates how the human sensitivity varies depending on lightness of an ambient environment. The lightness-frequency information includes information about a correspondence relationship between the lightness of the ambient environment and the human sensitivity. Referring to FIG. 7, the human may perceive that the sensitivity increases as the lightness of the ambient environment becomes lighter.

As described with reference to FIG. 4, the weighting circuit 1114 may receive a lightness value of an ambient environment from a main processor (not illustrated). The weighting circuit 1114 may obtain sensitivity corresponding to the obtained lightness value. The weighting circuit 1114 may calculate a lightness-frequency weight based on the obtained sensitivity. A magnitude of the lightness-frequency weight may be proportional to or equal to a magnitude of the obtained sensitivity.

Figure 8:
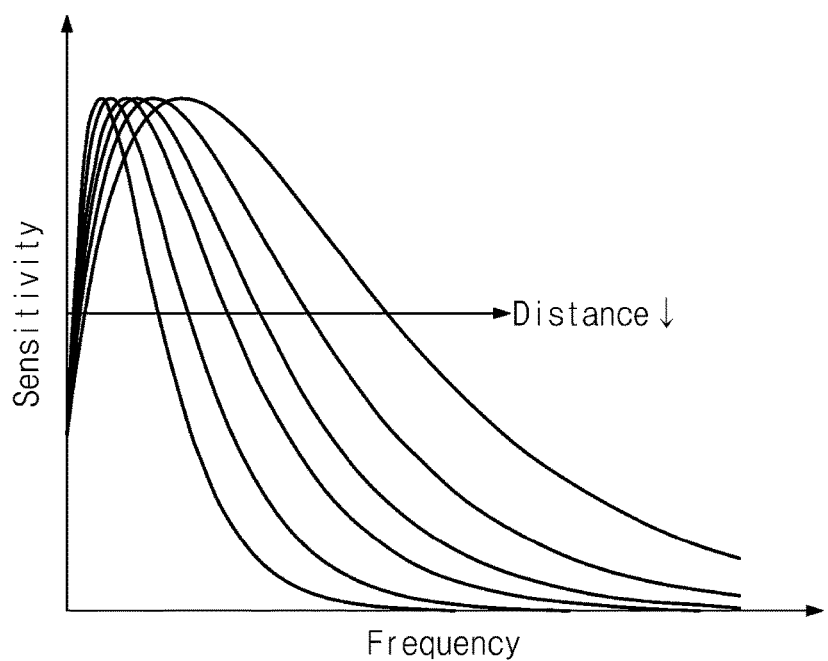
FIG. 8 is a graph for describing distance-frequency information.

FIG. 8 is a graph for describing distance-frequency information.

A horizontal axis of the graph represents a frequency. A vertical axis of the graph represents human sensitivity.

A graph of FIG. 8 may indicate how the human sensitivity varies depending on a distance between a subject and the electronic device 1000. The distance-frequency information includes information about a correspondence relationship between the distance between the subject and the electronic device 1000 and the human sensitivity. Referring to FIG. 8, the human may perceive that the sensitivity increases as the distance between the subject and the electronic device 1000 decreases.

As described with reference to FIG. 4, the weighting circuit 1114 may receive a distance value between the subject and the electronic device 1000 from a main processor (not illustrated). The weighting circuit 1114 may obtain sensitivity corresponding to the obtained distance value. The weighting circuit 1114 may calculate a distance-frequency weight based on the obtained sensitivity. A magnitude of the distance-frequency weight may be proportional to or equal to a magnitude of the obtained sensitivity.

Figure 9:
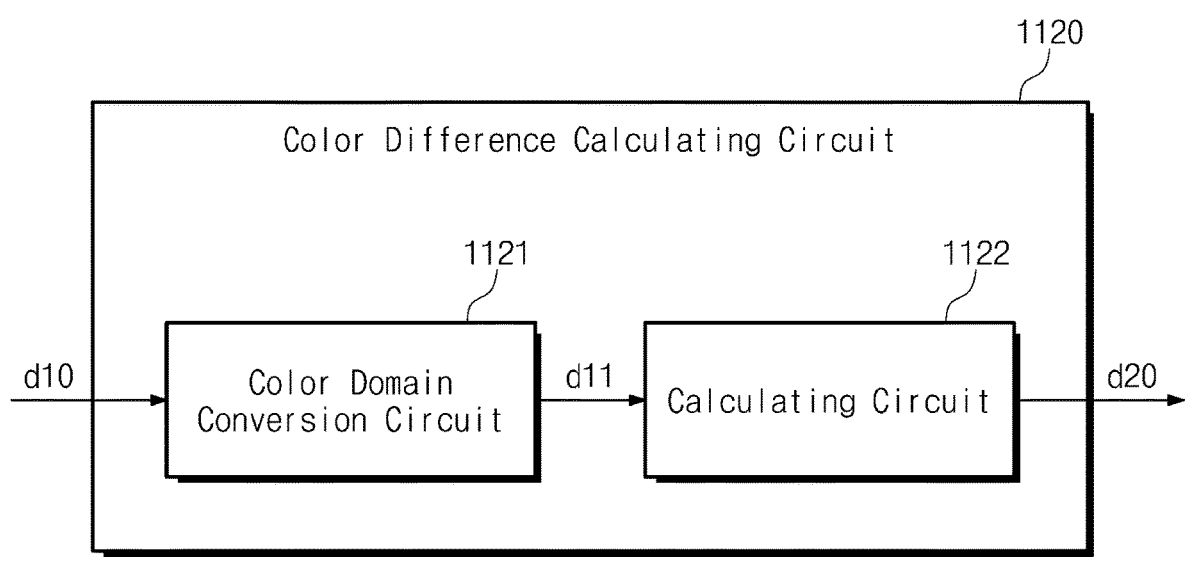
FIG. 9 is a block diagram illustrating a color difference calculating circuit, according to certain embodiments.

FIG. 9 is a block diagram illustrating a color difference calculating circuit.

The color difference calculating circuit 1120 may include a color domain conversion circuit 1121 and a calculating circuit 1122.

The color domain conversion circuit 1121 receives the processed color data d10. The color domain conversion circuit 1121 converts a color domain of the processed color data d10 to generate the third color data. For example, the color domain conversion circuit 1121 may convert the color domain of the processed color data d10 from YCbCr to RGB. In this example, the third color data may be RGB data.

The color domain conversion circuit 1121 may convert a color domain of the third color data to generate fourth color data d11. For example, the color domain conversion circuit 1121 may convert the color domain of the third color data from RGB to Lab. That is, the fourth color data d11 may be Lab data.

The calculating circuit 1122 receives the fourth color data d11 from the color domain conversion circuit 1121. As described with reference to FIG. 3, the image signal s0 may include information about a light input to a plurality of pixels. Data derived from the image signal s0 may include data of each of the plurality of pixels. Accordingly, the fourth color data d11 may also include a plurality of data respectively corresponding to the plurality of pixels. Below, for convenience of description, data corresponding to a first pixel from among the fourth color data d11 are referred to as "first sub-data", and data corresponding to a second pixel from among the fourth color data d11 are referred to as "second sub-data," etc. Terms "first," "second," "third," etc., may be used herein simply as a naming convention, to differentiate two components from each other, and may be used in the claims in a different manner than in the specification, again as a simple naming convention, in order to claim a certain desired scope.

The calculating circuit 1122 may calculate color difference values of the fourth color data d11. To calculate a color difference value of the fourth color data d11 means to calculate a color difference value between two sub-data (e.g., the first sub-data and the second sub-data) of the fourth color data d11. For example, the calculating circuit 1122 may calculate color difference values of all sub-data pairs capable of being selected from the fourth color data d11. For another example, the calculating circuit 1122 may calculate a color difference value between two adjacent sub-data on the color domain (e.g., two adjacent pixels).

The color difference value between the first sub-data and the second sub-data may be proportional to a sum of square values of difference values between coordinate values of the first sub-data and coordinate values of the second sub-data (e.g., wherein coordinate values refer to color coordinates in the fourth color data, for example in the Lab domain). For example, the color difference value between the first sub-data and the second sub-data may be a square root value of a sum of square values of difference values between coordinate values of the first sub-data and coordinate values of the second sub-data. The calculating circuit 1122 may output the color difference data d20 based on a calculation result. The color difference data d20 may include color difference values of the fourth color data d11.

Figure 10:
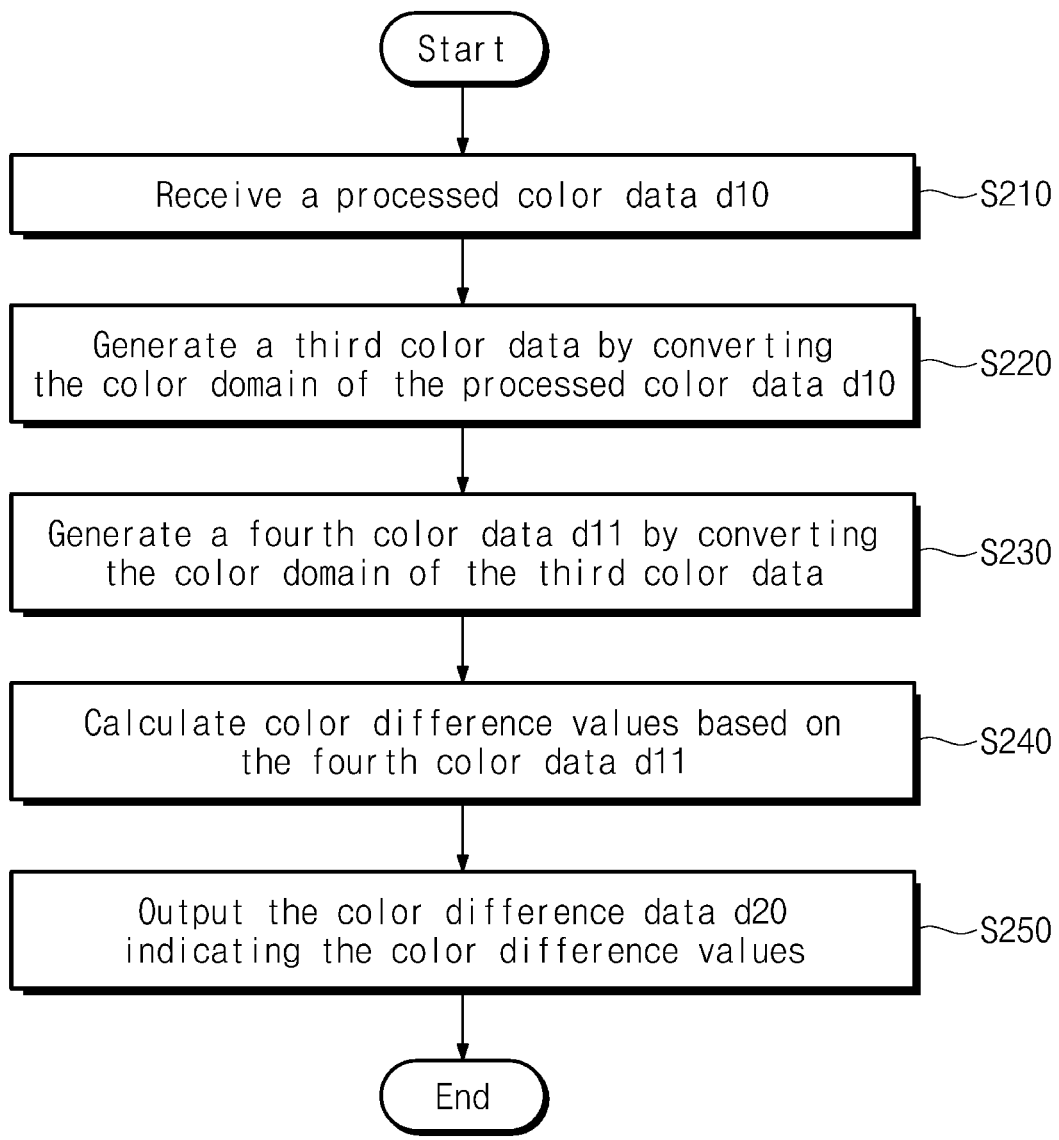
FIG. 10 is a flowchart illustrating an operation of a color difference calculating circuit of FIG. 9, according to certain embodiments.

FIG. 10 is a flowchart illustrating an operation of a color difference calculating circuit of FIG. 9.

In operation S210, the color domain conversion circuit 1121 receives the processed color data d10.

In operation S220, the color domain conversion circuit 1121 converts a color domain of the processed color data d10 to generate the third color data. For example, the third color data may be RGB data.

In operation S230, the color domain conversion circuit 1121 converts a color domain of the third color data to generate the fourth color data d11. For example, the fourth color data d11 may be Lab data.

In operation S240, the calculating circuit 1122 receives the fourth color data d11 from the color domain conversion circuit 1121. The calculating circuit 1122 then calculates color difference values of the fourth color data d11.

In operation S250, the calculating circuit 1122 may generate the color difference data d20 indicating the color difference values of the fourth color data d11. The calculating circuit 1122 outputs the color difference data d20 to the color stain classifying circuit 1130 of FIG. 3.

Figures 11, 12:
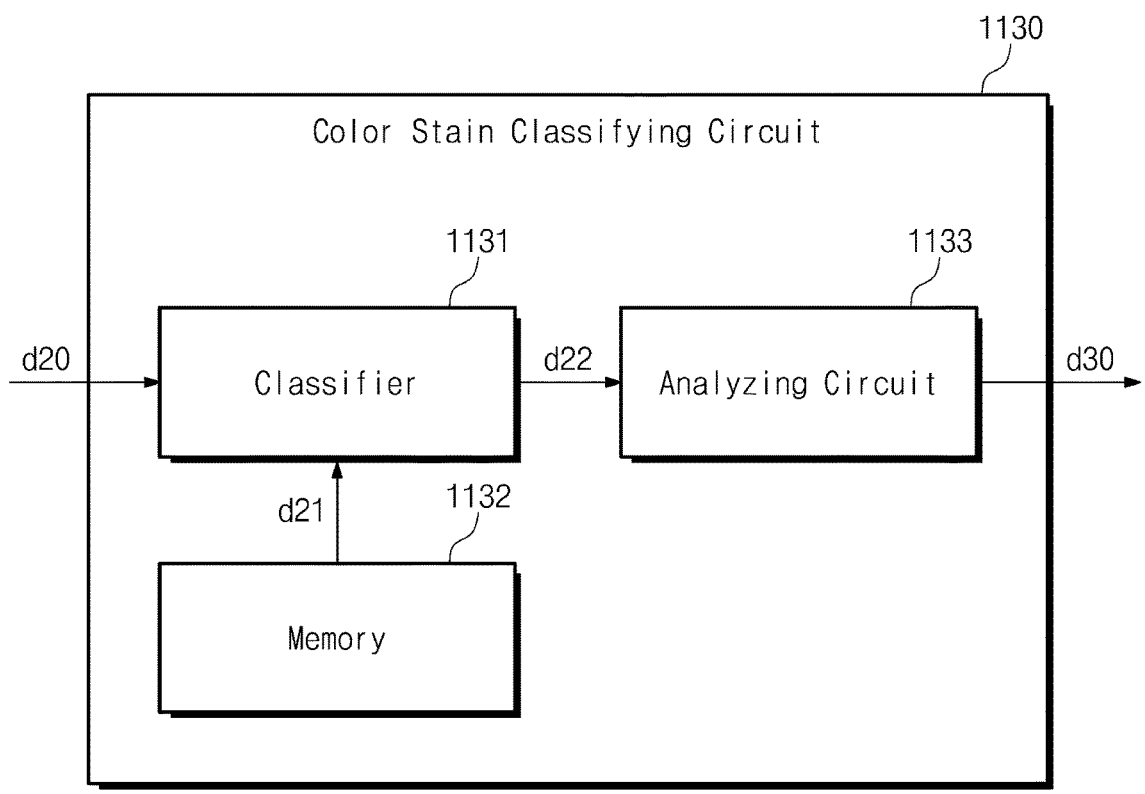
FIG. 11 is a block diagram illustrating the color stain classifying circuit 1130 of FIG. 3, according to certain embodiments.
FIG. 12 is a diagram illustrating information included in setting data.

FIG. 11 is a block diagram illustrating the color stain classifying circuit 1130 of FIG. 3.

The color stain classifying circuit 1130 may include a classifier 1131, a memory 1132, and an analyzing circuit 1133.

The classifier 1131, also described as a classifying circuit, receives the color difference data d20 from the color difference calculating circuit 1120 of FIG. 3. The color difference data d20 may indicate color difference values of the fourth color data d11. The classifier 1131 may receive and store setting data d21 from the memory 1132.

The memory 1132 may store the setting data d21 associated with a range of a color difference value noticeable by an observer. For example, the setting data d21 may include information indicating that a color stain corresponding to a color difference value belonging to a first range is unnoticeable by all observers, that a color stain corresponding to a color difference value belonging to a second range is noticeable by some observers, that a color stain corresponding to a color difference value belonging to a third range is noticeable by all observers, etc. The setting data d21 will be more fully described with reference to FIG. 12.

In the specification, in the case where a color difference value is a color difference value calculated based on the first sub-data being data corresponding to the first pixel and the second sub-data being data corresponding to the second pixel, a color stain corresponding to the color difference value means a color stain of an image, which appears at locations corresponding to the first pixel and the second pixel.

The classifier 1131 may determine whether color stains corresponding to the color difference data d20 are noticeable by an observer, based on the color difference data d20 and the setting data d21. In detail, the classifier 1131 may allow color values indicated by the color difference data d20 to correspond to ranges indicated by the setting data d21, respectively. The classifier 1131 may select only color values noticeable by an observer, depending on a correspondence result.

A reference that is used for the classifier 1131 to select color values noticeable by an observer may vary depending on settings of the user or an operating mode of the electronic device 1000 of FIG. 1. For example, in a mode where a color stain performance is strictly managed, the classifier 1131 may select all color values noticeable by an observer. In a mode where a color stain performance is less strictly managed, the classifier 1131 may select only color values noticeable by all observers.

The classifier 1131 may output selected data d22 based on a selection result. The selected data d22 may indicate color values selected by the classifier 1131.

The analyzing circuit 1133 may receive the selected data d22 from the classifier 1131. The analyzing circuit 1133 may evaluate or analyze a color stain performance based on the selected data d22. In detail, based on the selected data d22, the analyzing circuit 1133 may analyze a strength of a color stain, a probability of occurrence of a color stain for each lightness of an ambient environment, a region where a color stain occurs, etc. The color stain classifying circuit 1130 may generate the result data d30 indicating a color stain analyzing result. This result may be used to correct or adjust a color or intensity of pixels on a display.

FIG. 12 is a diagram illustrating information included in setting data.

As described with reference to FIG. 11, the classifier 1131 may determine whether color stains corresponding to the color difference data d20 are noticeable by an observer, based on the color difference data d20 and the setting data d21. The setting data d21 may include information about a range of color difference values noticeable by an observer.

Referring to FIG. 12, when a color difference is a value between 0.0 and 1.0, a color stain corresponding to the color difference is unnoticeable by an observer. When a color difference is a value between 1.0 and 2.0, a color stain corresponding to the color difference is only noticeable by a few observers. When a color difference is a value between 2.0 and 3.5, a color stain corresponding to the color difference is noticeable by general observers. When a color difference is a value between 3.5 and 5.0, a color stain corresponding to the color difference is clearly noticeable by all observers. The case where a color difference is 5.0 or more means that signals generated from two pixels associated with the color difference indicate different colors.

The classifier 1131 may select color values noticeable by observers from among color values of the color difference data d20, based on the setting data d21. For example, the classifier 1131 may select color values between 2.0 and 5.0. For another example, the classifier 1131 may select color values between 3.5 and 5.0.

Figure 13:
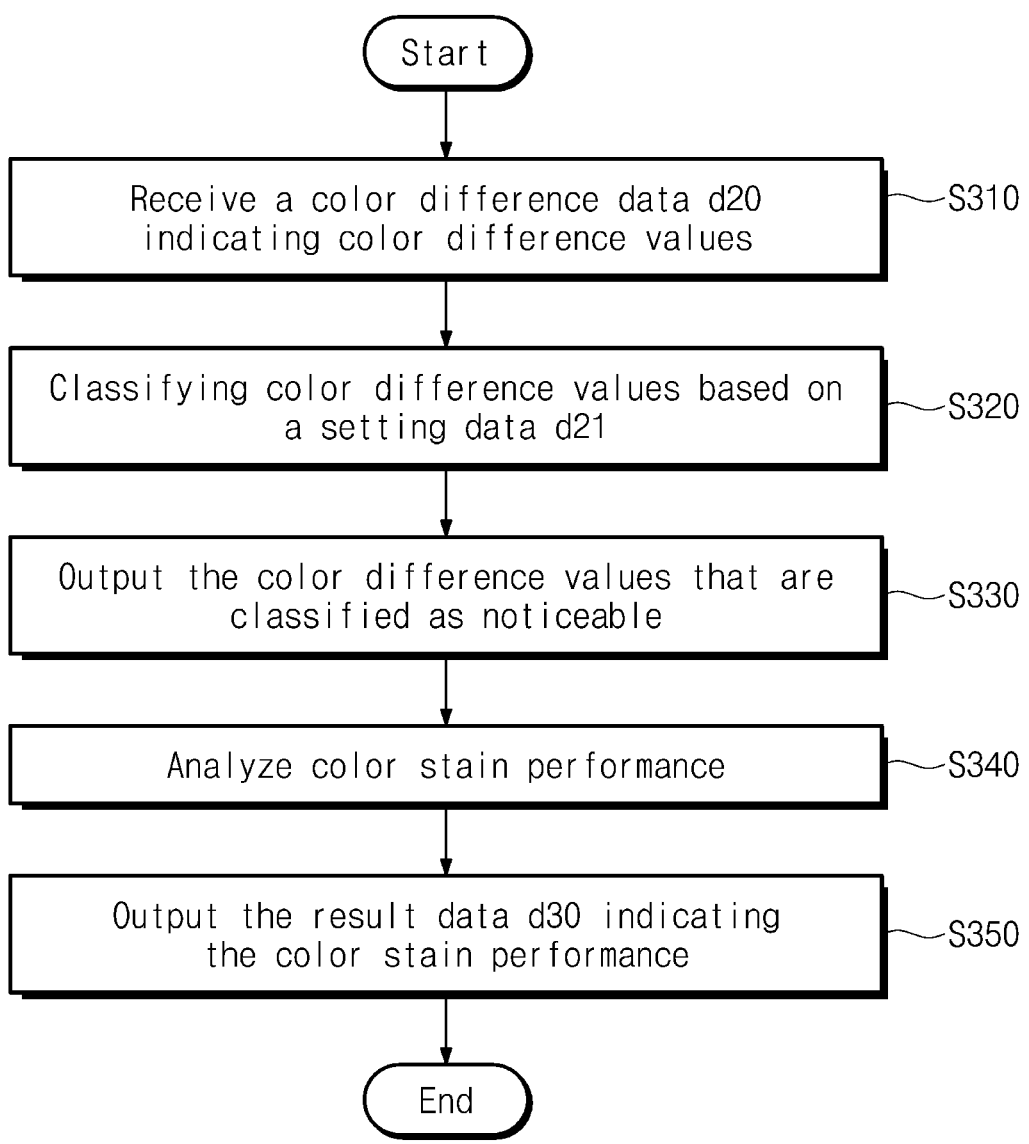
FIG. 13 is a flowchart for describing an operation of a color stain classifying circuit of FIG. 11, according to certain embodiments.

FIG. 13 is a flowchart for describing an operation of a color stain classifying circuit of FIG. 11.

In operation S310, the classifier 1131 receives the color difference data d20 from the color difference calculating circuit 1120 of FIG. 3. The color difference data d20 may include color difference values of the fourth color data d11.

In operation S320, the classifier 1131 stores the setting data d21 from the memory 1132. The classifier 1131 may determine whether color stains corresponding to the color difference data d20 are noticeable by an observer, based on the setting data d21. For example, the classifier 1131 may classify color difference values that the color difference data d20 indicate, based on the setting data d21.

In operation S330, the classifier 1131 outputs color difference values classified under a certain category (e.g., as being clearly noticeable).

In operation S340, the analyzing circuit 1133 may receive the color difference values output from the classifier 1131. The analyzing circuit 1133 may analyze a color stain performance of the electronic device 1000 of FIG. 1, based on the received color difference values.

In operation S350, the analyzing circuit 1133 may output the result data d30 based on an analysis result. The result data d30 may indicate the color stain performance of the electronic device 1000. Also, the result data d30 may indicate the analysis result associated with a color stain.

Figure 14:
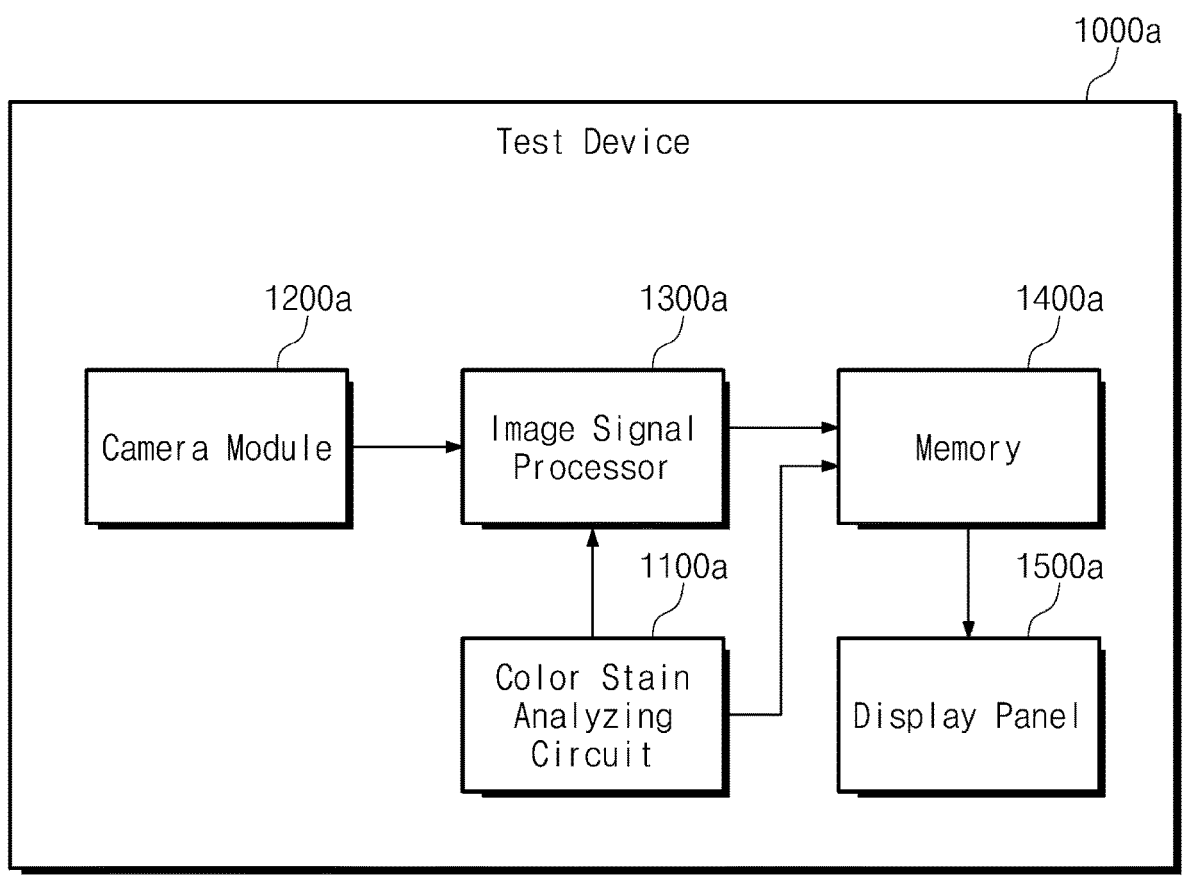
FIG. 14 is a block diagram illustrating an embodiment of an electronic device of FIG. 1.

FIG. 14 is a block diagram illustrating an embodiment of an electronic device of FIG. 1.

According to an embodiment of the inventive concept, the electronic device 1000 of FIG. 1 may be a test device 1000a for evaluating and improving components (e.g., a lens, a sensor, an aperture, and an image signal processor) included in the electronic device 1000 before a product is released.

The test device 1000a may include a color stain analyzing circuit 1100a, a camera module 1200a, an image signal processor 1300a, a memory 1400a, and a display panel 1500a.

The camera module 1200a may include a lens, a sensor, an aperture, etc. The test device 1000a may photograph a subject by using the camera module 1200a. The camera module 1200a may output an image signal based on a light received from the lens. The image signal that is mentioned in the description given with reference to FIG. 14 may correspond to the image signal s0 of FIG. 3.

The image signal processor 1300a may receive the image signal from the camera module 1200a. The image signal processor 1300a may process the image signal to generate image data. The image signal processor 1300a may perform some of the operations of the color stain analyzing circuit 1100 of FIG. 3 for the purpose of generating the image data. For example, the image signal processor 1300a may pre-process the image signal.

The color stain analyzing circuit 1100a provides substantially the same operations as the color stain analyzing circuit 1100 of FIG. 3. However, the color stain analyzing circuit 1100a may receive the pre-processed image signal from the image signal processor 1300a. Accordingly, the color stain analyzing circuit 1100a may omit the process of pre-processing the image signal. Through the process described with reference to FIG. 3, the color stain analyzing circuit 1100a may analyze a strength of a color stain, a probability of occurrence of a color stain for each lightness of an ambient environment, a region where a color stain occurs, etc. based on the image signal. Also, the color stain analyzing circuit 1100a may evaluate and analyze a color stain performance of the test device 1000a. The color stain analyzing circuit 1100a may output result data based on an analysis result. The result data that are mentioned in the description given with reference to FIG. 14 may correspond to the result data d30 of FIG. 3.

The memory 1400a may receive the result data from the color stain analyzing circuit 1100a. The memory 1400a may receive the image data from the image signal processor 1300a.

Under control of a controller (not illustrated), the display panel 1500a may display the result data and the image data stored in the memory 1400a in the form of an image. The user may be provided with information about a color stain performance of the test device 1000a, based on the image displayed in the display panel 1500a. The user may adjust settings and the like of the test device 1000a based on the color stain performance of the test device 1000a. However, the inventive concept is not limited thereto. For example, the test device 1000a may automatically adjust the settings and the like of the test device 1000a.

Figure 15:
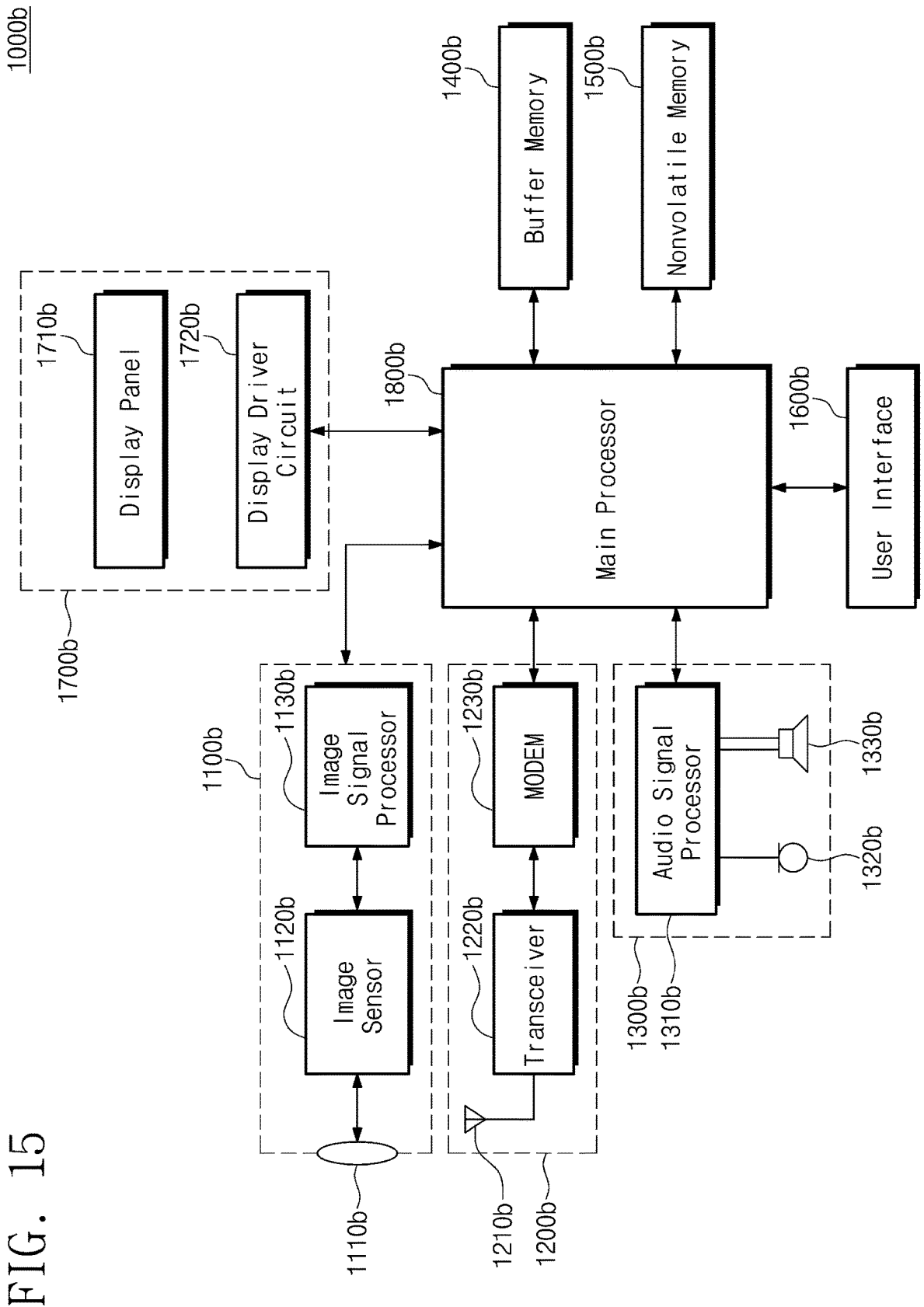
FIG. 15 is a block diagram illustrating another embodiment of an electronic device of FIG. 1.

FIG. 15 is a block diagram illustrating another embodiment of an electronic device of FIG. 1.

An electronic device 1000b may correspond to an embodiment of the electronic device 1000 of FIG. 1. In detail, the electronic device 1000b may be a photographing device that a consumer is using.

The electronic device 1000b may include various electronic circuits. For example, the electronic circuits of the electronic device 1000b may include an image processing block 1100b, a communication block 1200b, an audio processing block 1300b, a buffer memory 1400b, a nonvolatile memory 1500b, a user interface 1600b, a display device 1700b, and a main processor 1800b.

The image processing block 1100b may receive a light through a lens 1110b. An image sensor 1120b and an image signal processor 1130b included in the image processing block 1100b may generate image data associated with an external object, based on the received light.

The image signal processor 1130b may include a color stain classifying circuit. The color stain classifying circuit may receive an image signal from the image sensor 1120b. The image signal that is mentioned in the description given with reference to FIG. 15 may correspond to the image signal s0 of FIG. 3. The color stain classifying circuit may analyze a color stain appearing at the captured image based on the image signal. The image signal processor 1130b may perform a noise cancellation operation based on an analysis result of the color stain classifying circuit for the purpose of removing a color stain of an image. The image signal processor 1130b will be more fully described with reference to FIG. 16.

The communication block 1200b may exchange signals with an external device/system through an antenna 1210b. A transceiver 1220b and a MODEM (Modulator/Demodulator) 1230b of the communication block 1200b may process signals, which are exchanged with the external device/system, in compliance with various wireless communication protocols.

The audio processing block 1300b may process sound information by using an audio signal processor 1310b, thus playing and outputting the audio. The audio processing block 1300b may receive an audio input through a microphone 1320b. The audio processing block 1300b may output the played audio through a speaker 1330b.

The buffer memory 1400b may store data that are used for an operation of the electronic device 1000b. For example, the buffer memory 1400b may temporarily store data processed or to be processed by the main processor 1800b. For example, the buffer memory 1400b may include a volatile memory such as a static random access memory (SRAM), a dynamic RAM (DRAM), or a synchronous DRAM (SDRAM), and/or a nonvolatile memory such as a phase-change RAM (PRAM), a magneto-resistive RAM (MRAM), a resistive RAM (ReRAM), or a ferroelectric RAM (FRAM).

The nonvolatile memory 1500b may be a physical storage device. In this case, the nonvolatile memory 1500b may include one or more nonvolatile memories, a memory controller, and a buffer. The nonvolatile memory may store data regardless of whether a power is supplied. For example, the nonvolatile memory may include at least one of a flash memory, a PRAM, an MRAM, an ReRAM, a FRAM, etc. For example, the nonvolatile memory may include a removable memory such as a secure digital (SD) card, and/or an embedded memory such as an embedded multimedia card (eMMC).

Also, the nonvolatile memory 1500b may be a virtual storage device that is operated by a virtual storage driver in an operating system. In this case, the nonvolatile memory 1500b may store data without limitation on a physical method or a substantial storage device.

The user interface 1600b may arbitrate communication between the user and the electronic device 1000b. For example, the user interface 1600b may include input interfaces such as a keypad, a button, a touch screen, a touch pad, a gyroscope sensor, a vibration sensor, and an acceleration sensor. For example, the user interface 1600b may include output interfaces such as a motor and a LED lamp.

The display device 1700b may receive data from an external device (e.g., the main processor 1800b). A display driver circuit 1720b may display an image in a display panel 1710b based on data input to the display device 1700b.

The main processor 1800b may control overall operations of the components of the electronic device 1000b. The main processor 1800b may process various operations for the purpose of operating the electronic device 1000b. For example, the main processor 1800b may be implemented with an operation processing device/circuit, which includes one or more processor cores, such as a general-purpose processor, a special-purpose processor, an application processor, or a microprocessor.

However, the exemplary components illustrated in FIG. 15 are provided for better understanding, and are not intended to limit the inventive concept. The electronic device 1000b may not include one or more of the components illustrated in FIG. 15; additionally or alternatively, the electronic device 1000b may further include at least one component not illustrated in FIG. 15. Also, the image signal processor 1130b may be included in the main processor 1800b, not the image processing block 1100b.

Figure 16:
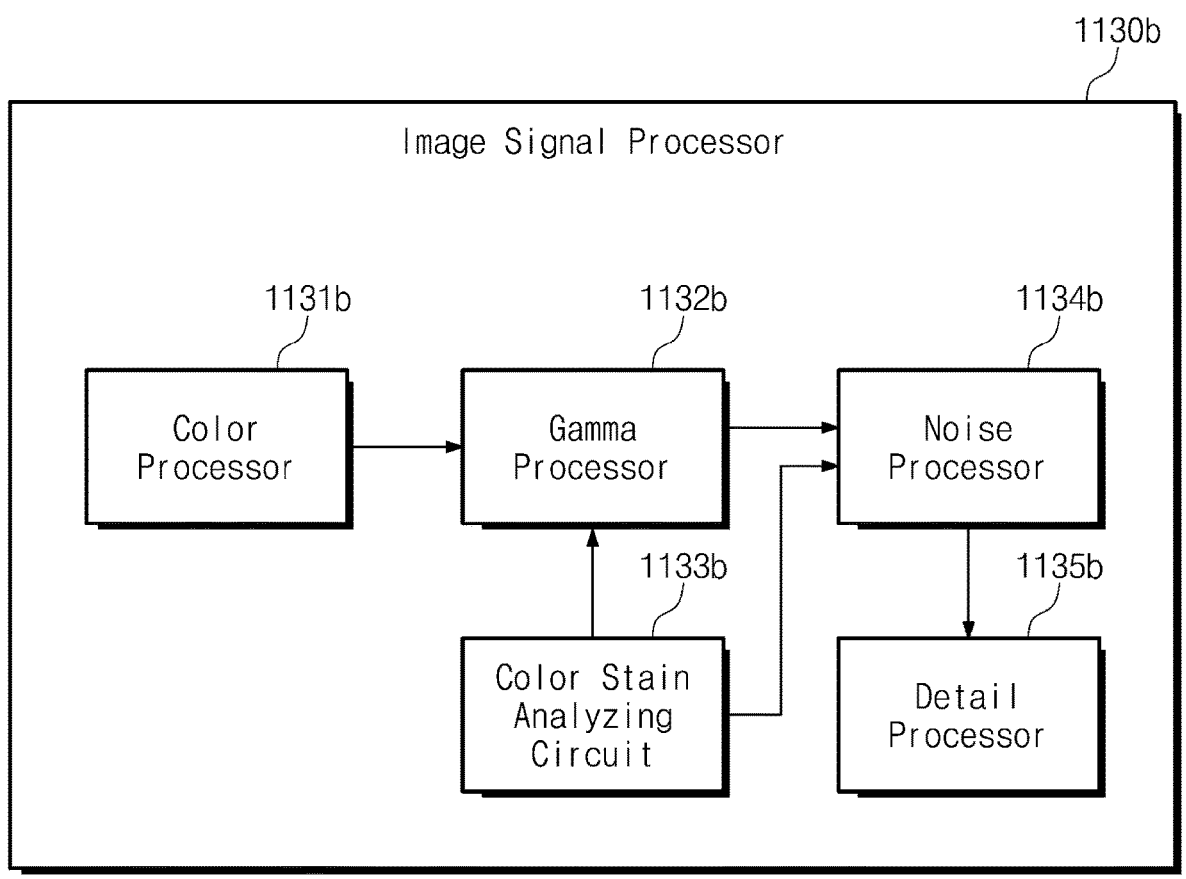
FIG. 16 is a block diagram illustrating an image signal processor of FIG. 15, according to certain embodiments.

FIG. 16 is a block diagram illustrating an image signal processor of FIG. 15.

The image signal processor 1130b may include a color processor 1131b, a gamma processor 1132b, a color stain analyzing circuit 1133b, a noise processor 1134b, and a detail processor 1135b. However, the inventive concept is not limited thereto. For example, the image signal processor 1130b may not include one or more of the components illustrated in FIG. 16; additionally or alternatively, the image signal processor 1130b may further include at least one component not illustrated in FIG. 16. The image signal processor 1130b may receive an image signal from the image sensor 1120b of FIG. 15. The color processor 1131b may calibrate a color signal of the image signal, which is associated with a color.

The gamma processor 1132b may receive the image signal, of which the color signal is calibrated, from the color processor 1131b. The gamma processor 1132b may calibrate a gamma signal of the received image signal, which is associated with luminance.

The color stain analyzing circuit 1133b may receive an image signal from the image sensor 1120b. As described with reference to FIG. 3, the color stain analyzing circuit 1133b may analyze a color stain appearing at the captured image based on the image signal. The color stain analyzing circuit 1133b may output result data based on an analysis result.

The noise processor 1134b may receive the result data from the color stain analyzing circuit 1133b. The noise processor 1134b may receive the calibrated image signal from the gamma processor 1132b. The noise processor 1134b may remove a noise of the received image signal based on the result data such that the number of color stains appearing at the image decreases.

The detail processor 1135b may receive the noise-removed image signal from the noise processor 1134b. The detail processor 1135b may perform calibration operations for improving a resolution of the image.

An electronic device according to an embodiment of the inventive concept may calculate the number and a size of color stains noticeable by the user, in consideration of a visual recognition characteristic of the user. Also, based on a calculation result, the electronic device may score analysis and evaluation results associated with color stains, such as a probability of occurrence of a color stain and a strength of a color stain.

While the inventive concept has been described with reference to exemplary embodiments thereof, it will be apparent to those of ordinary skill in the art that various changes and modifications may be made thereto without departing from the spirit and scope of the inventive concept as set forth in the following claims.

We claim:

1. An electronic device comprising:
a frequency analyzing circuit configured to receive an image signal including information about a subject, to convert the image signal into first color data which are based on a first color domain, to convert the first color data into frequency data which are based on a frequency domain, and to apply frequency weights corresponding to the frequency data to the first color data to generate processed color data; and
a color difference calculating circuit configured to calculate color difference values for evaluating a color stain generated by the image signal, based on the processed color data,
wherein the frequency weights are selected based on a relationship between sensitivity information of an observer and a change in frequency of the frequency data,
wherein the frequency data include a luminance-frequency value corresponding to a luminance value of the first color data and a color-frequency value corresponding to a color value of the first color data, and
wherein the frequency weights include a luminance-frequency weight corresponding to the luminance-frequency value and a color-frequency weight corresponding to the color-frequency value.

2. The electronic device of claim 1, wherein the frequency analyzing circuit converts the image signal into second color data which are based on a second color domain, and converts a color domain of the second color data into the first color domain to generate the first color data.

3. The electronic device of claim 2, wherein the first color data are YCbCr data, and
wherein the second color data are RGB data.

4. The electronic device of claim 1, wherein the frequency analyzing circuit performs a Fourier transform on the first color data to calculate frequency values, and
wherein the frequency data include the frequency values.

5. The electronic device of claim 1, wherein the frequency analyzing circuit multiplies the first color data and the frequency weights such that the frequency weights are applied to the first color data.

6. The electronic device of claim 1,
wherein the frequency analyzing circuit increases the luminance value of the first color data in proportion to the luminance-frequency weight and increases the color value of the first color data in proportion to the color-frequency weight.

7. The electronic device of claim 6, wherein the frequency analyzing circuit multiplies the luminance-frequency weight and the luminance value of the first color data together and multiplies the color-frequency weight and the color value of the first color data together.

8. The electronic device of claim 6, wherein the frequency weights further includes a lightness-frequency weight corresponding to a lightness value of an external environment and a distance-frequency weight corresponding to a distance value between the subject and the electronic device, and
wherein the frequency analyzing circuit increases the luminance value of the first color data and the color value of the first color data in proportion to the lightness-frequency weight and the distance-frequency weight.

9. An electronic device comprising:
a frequency analyzing circuit configured to receive an image signal including information about a subject, to convert the image signal into first color data which are based on a first color domain, to convert the first color data into frequency data which are based on a frequency domain, and to apply frequency weights corresponding to the frequency data to the first color data to generate processed color data;
a color difference calculating circuit configured to calculate color difference values for evaluating a color stain generated by the image signal, based on the processed color data; and
a noise processor configured to remove noise from the received image signal based on an output from the color difference calculating circuit, to decrease the number of color stains appearing at the image of the image signal,
wherein the frequency weights are selected based on a relationship between sensitivity information of an observer and a change in frequency of the frequency data.

10. The electronic device of claim 9, wherein the frequency analyzing circuit converts the image signal into second color data which are based on a second color domain, and converts a color domain of the second color data into the first color domain to generate the first color data.

11. The electronic device of claim 10, wherein the first color data are YCbCr data, and
wherein the second color data are RGB data.

12. The electronic device of claim 9, wherein the frequency analyzing circuit performs a Fourier transform on the first color data to calculate frequency values, and
wherein the frequency data include the frequency values.

13. The electronic device of claim 9, wherein the frequency analyzing circuit multiplies the first color data and the frequency weights such that the frequency weights are applied to the first color data.

14. The electronic device of claim 9, wherein the frequency data include a luminance-frequency value corresponding to a luminance value of the first color data and a color-frequency value corresponding to a color value of the first color data,
wherein the frequency weights include a luminance-frequency weight corresponding to the luminance-frequency value and a color-frequency weight corresponding to the color-frequency value, and
wherein the frequency analyzing circuit increases the luminance value of the first color data in proportion to the luminance-frequency weight and increases the color value of the first color data in proportion to the color-frequency weight.

15. The electronic device of claim 14, wherein the frequency analyzing circuit multiplies the luminance-frequency weight and the luminance value of the first color data together and multiplies the color-frequency weight and the color value of the first color data together.

16. The electronic device of claim 14, wherein the frequency weights further includes a lightness-frequency weight corresponding to a lightness value of an external environment and a distance-frequency weight corresponding to a distance value between the subject and the electronic device, and wherein the frequency analyzing circuit increases the luminance value of the first color data and the color value of the first color data in proportion to the lightness-frequency weight and the distance-frequency weight.

\* \* \* \* \*